3,475,338
PROCESS OF CUTTING METALS AND CUTTING OIL CONTAINING ALLYLIC HYDROXYL-TERMINATED UNSATURATED DIENE POLYMER
Donald D. Carlos, Crown Point, Ind., and David W. Young, Homewood, and Robert R. Chambers, Chicago, Ill., assignors to Sinclair Research, Inc., New York, N.Y., a corporation of Delaware
No Drawing. Filed Oct. 13, 1966, Ser. No. 586,385
Int. Cl. C10m 1/28
U.S. Cl. 252—59                          15 Claims

ABSTRACT OF THE DISCLOSURE

Substantial reduction in torque is obtained in machining metals, such as aluminum and copper, in the presence of mineral lubricating oils containing aliphatic 1,3-diene hydrocarbon unsaturated polymers, particularly hydroxyl-terminated aliphatic 1,3-diene hydrocarbon unsaturated polymers. Cutting oils, particularly suited for machining metals such as aluminum and copper, are provided by including in a mineral lubricating oil about 0.5 to 70 weight percent of an aliphatic diene unsaturated hydrocarbon polymer having the majority of its unsaturation in the main hydrocarbon chain and at least about 1.8 predominantly primary, terminal allylic hydroxyl groups per polymer molecule, and a Staudinger molecular weight of about 200 to 25,000.

---

This invention relates to novel cutting oil compositions, and in particular, cutting oil compositions containing aliphatic diene hydrocarbon polymer additives especially suitable for cutting metals such as aluminum and copper.

The steady increase in the use of such metals as aluminum and copper in numerous industries over the past five years has made it necessary to find ways of machining these metals with improved efficiency. In the past, efforts to machine metals such as aluminum and copper have centered around the use of light viscosity, kerosene-type non-additive oils. Light fluids were necessary because conventional cutting oils containing sulfur, phosphorus and other extreme pressure additives stained and gave a poor finish to the aluminum and copper.

It has recently been shown that certain olefinic substances are exceptionally effective in machining metals such as aluminum and copper. The reason for this effectiveness is not known for certain. However, it is thought that a metal-olefin complex is formed during the cutting operation and that this effect leads to reduced feed force and improved surface finish.

We have now found that base oil-soluble aliphatic diene hydrocarbon polymers when added to a base mineral oil in sufficient amounts are effective in reducing torque and improving surface finish when cutting aluminum and copper metals. The extensive, diverse unsaturation, as well as the molecular weight of these resins, combine to make them excellent aluminum and copper cutting oil additives. Also, the hydrocarbon nature of the diene polymer backbone permits blends to be made with a variety of base oil stocks. Further, because of the microstructure of these diene polymer oils, they do not show undue drying rates and thus present no serious storage problems. In general, the aliphatic diene hydrocarbon polymer-containing cutting oils of the present invention can be used in a wide range of aluminum and copper machining operations such as drawing, extruding, tapping, reaming, broaching, grinding, threading, etc.

The aliphatic diene hydrocarbon polymer additives of the present invention include liquid diene polymer resins obtained by the various catalytic diene polymerization processes, for example, liquid polybutadiene resins prepared by processes employing a sodium catalyst such as the process described in U.S. Patent 2,631,175 to Crouch or a BF$_3$-etherate catalyst system, such as the process described in U.S. Patent 2,708,639 to Miller. The preferred aliphatic diene hydrocarbon polymer additive of the present invention is a hydroxyl-containing polymer oil generally having on the average at least about 1.8 predominantly primary, terminal, i.e., attached to a terminal carbon atom, hydroxyl groups per polymer molecule. Most advantageously the polymer has greater than two average allylic, terminal hydroxyl groups, e.g., at least 2.1 to say, 2.6 or even 3 or more. Also, two terminal hydroxyls are generally separated by a long carbon-carbon chain. Determined as milli-equivalents of potassium hydroxide equivalent to the hydroxyl content of one gram of polymer, the polymers will often have a hydroxyl value of about 0.5 to 1.5, preferably 0.7 to 1.0. The hydroxyl-containing diene polymers used in the present invention may have number average molecular weights in the range of about 200 to 25,000 (Staudinger) and viscosities at 30° C. of about 5 to 20,000 poises and are often prepared using a hydrogen peroxide catalyst. One such method of preparation is described in copending application Serial No. 447,241, filed April 12, 1965. The resulting hydroxyl-containing diene polymers are predominantly linear i.e., 1,4-polymers in the case of butadiene-1,3 and thereby differ from those non-hydroxyl-containing diene polymers produced, for example, by sodium catalysis. The preferred aliphatic diene hydrocarbon polymers will be in the molecular weight range of about 1200 to 7000 with viscosities at 30° C. of about 15 to 5000 poises. The preferred aliphatic diene hydrocarbon polymers also have the majority of their unsaturation in the main hydrocarbon chain.

The diene hydrocarbons which are employed to make the polymers are aliphatic, unsubstituted, 2-substituted or 2,3-disubstituted-1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, etc. Typical dienes which may be employed are 1,3-butadiene, isoprene, chloroprene, 2-cyano-1,3-butadiene, 2,3-dimethyl-1,3-butadiene, etc.

Mono-olefinically unsaturated monomers may also be incorporated into the aliphatic diene hydrocarbon polymers used in this invention. Generally, they will be present only in minor amounts but may be present in up to about 40 percent by weight of the total monomers. Usable monomers include alpha-mono-olefinic materials of about 2 or 3 to 10 or 12 carbon atoms such as styrene, vinyl toluene, methyl methacrylate, methacrylate, acrylic esters, acrylonitrile, vinyl chloride, etc.

To cite an example of the chemical structure of the preferred aliphatic diene hydrocarbon polymer of this invention, a simplified structural formula of polybutadiene may be given as:

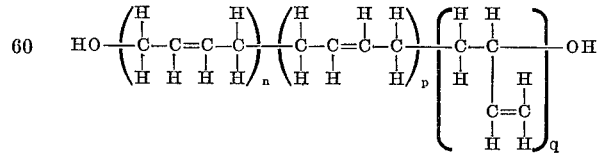

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1,4- units, with about 15–25 percent 1,2 units. Branching may also occur in the above polymers, especially those prepared at higher temperatures. It should be emphasized, however, that the present invention is not limited to the use of hydroxyl-containing aliphatic diene hydrocarbon polymers nor aliphatic hydroxyl-containing diene hydrocarbon polymers having the predominating trans-1,4- structure, although such are highly preferred.

The oils used as the base and major component in the cutting oils of the present invention are mineral lubricating oils. The oils used include the petroleum lubricating oils such as refined coastal oils and refined Mid-Continent oils. The oils may be refined by acid treatment, solvent extraction, hydrogenation or other procedures. Although various oils of lubricating viscosity can be used in the products of my invention, it is preferred to use a substantially anhydrous lubricating oil with a viscosity from about 50 to 2000 SUS at 100° F., preferably 75 to 500 SUS at 100° F. We have had best results with an acid-refined coastal oil with a viscosity of about 100 SUS at 100° F.

The amount of the aliphatic diene hydrocarbon polymer added to the base oil may depend upon the particular base oil employed and the machining operation in which the cutting oil is used. Often the amounts will fall within the range of about 0.5 to 70% by weight, preferably about 2 to 30% by weight, based on the mineral oil.

Additional optional additives may be used in small amounts in the cutting oil compositions of the invention such as bactericides, corrosion inhibitors, anti-foam agents, etc. Moreover, they may be used either alone or in combination, for instance, in an amount of about 0.5–1 percent by weight.

The following examples will further illustrate the present invention, but they are not to be considered limiting.

EXAMPLES

To a glass bottle containing 10 parts of aqueous (50% by weight) hydrogen peroxide were added 70 parts isopropanol and 100 parts butadiene-1,3. The bottle was capped and placed in a steam pressure chamber and held at 118° C. for 2 hours. After cooling, the bottle was opened and from the polybutadiene therein the volatiles were removed, e.g., butadiene-1,3, butadiene dimer, isopropanol, acetone, residual hydrogen peroxide, water, etc. This removal was accomplished with the aid of heat and vacuum followed by steam and vacuum. The resulting product was a clear, viscous liquid polybutadiene having a hydroxyl value of 0.95 meq./g., about 2.2 terminal, allylic hydroxyl groups (predominantly primary) per molecule, a molecular weight of approximately 2200, a viscosity of 50 poises, and an iodine number of over 300.

The polybutadiene oil thus prepared (Polymer B of Table I) and other polybutadiene oils A, C and D listed in Table I, prepared in a similar manner, were added to a mineral oil base stock and evaluated for torque reduction in a metal tapping test, using both aluminum and copper metals. In addition, aluminum tapping tests were run using essentially hydroxyl-free diene hydrocarbon polymers added to a base mineral oil. One of the non-hydroxyl diene hydrocarbon polymers designated Polymer E is a polybutadiene oil prepared using a sodium catalyst and the other designated Polymer F is a polybutadiene oil prepared using a $BF_3$-etherate catalyst system. For comparison, test runs were made using a base mineral oil containing no diene hydrocarbon polymer. The base mineral oil used in the tests is an acid refined coastal mineral lubricating oil having a viscosity of 100 SUS at 100° F. The results are listed in Table II.

TABLE I

| | Polymer A | Polymer B | Polymer C | Polymer D |
|---|---|---|---|---|
| Polymer type | (1) | (1) | (2) | (3) |
| Butadiene, wt. percent | 100 | 100 | 75 | 85 |
| Styrene, wt. percent | | | 25 | |
| Acrylonitrile, wt. percent | | | | 15 |
| Viscosity, poises at 30° C | 200 | 50 | 250 | 550 |
| Hydroxyl content, meq./gm | 0.80 | 0.95 | 0.95 | 0.80 |
| Hydroxyl number (KOH mg./gm.) | 45 | 53 | 53 | 45 |
| Molecular wt., avg | 3,000–3,500 | 2,200–2,500 | 2,200–2,500 | 2,500–3,000 |
| Moisture, wt. percent | 0.05 | 0.05 | 0.05 | 0.05 |
| Iodine number | 395 | 398 | 335 | 345 |
| Wt. per gal., lbs | 7.5 | 7.5 | 7.6 | 7.7 |

1 Homopolymer.
2 Styrene copolymer.
3 Acrylonitrile copolymer.
Polybutadiene microstructure (all polymers).
Trans-1,4, 60%; cis-1,4. 20%; vinyl-1,2, 20%.

TABLE II.—ALUMINUM TAPPING TEST RESULTS

| | Torque in inch-pounds | | | Copper Tapping Test Results, Torque in inch-pounds |
|---|---|---|---|---|
| | Tap No. 1 | Tap No. 2 | Tap No. 3 | |
| Acid refined coastal oil (100 SUS at 100° F.) | 379 | 332 | 392 | 315 |
| 2.5% Polymer B in acid refined coastal oil (100 SUS at 100° F.) | | 270 | 273 | 256 |
| 5% Polymer B in acid refined coastal oil (100 SUS at 100° F.) | 284 | 261 | 294 | 260 |
| 10% Polymer B in acid refined coastal oil (100 SUS at 100° F.) | 277 | 263 | | 251 |
| 15% Polymer B in acid refined coastal oil (100 SUS at 100° F.) | 277 | 268 | | 254 |
| 20% Polymer B in acid refined coastal oil (100 SUS at 100° F.) | 291 | 263 | | 250 |
| 5% Polymer A in acid refined coastal oil (100 SUS at 100° F.) | | 251 | 272 | 245 |
| 5% Polymer D in acid refined coastal oil (100 SUS at 100° F.) | | 275 | 278 | 265 |
| 5% Polymer C in acid refined coastal oil (100 SUS at 100° F.) | | 268 | 275 | 259 |
| 5% Polymer E in acid refined coastal oil (100 SUS at 100° F.) | 286 | 263 | 284 | 282 |
| 5% Polymer F in acid refined coastal oil (100 SUS at 100° F.) | 274 | 255 | 268 | 284 |

The data show that without exception, notable torque reduction was observed for all the aliphatic diene hydrocarbon polymer-containing cutting oils subjected to both the aluminum and copper tapping tests. Good results occurred at low polymer concentrations in the acid refined coastal mineral oil. However, other polymer concentrations and base mineral oil stock variations may be required, when the cutting oils are used in different industrial machining operations, such as drawing or extruding.

It is claimed:

1. A cutting oil composition comprising a mineral lubricating oil in lubricating amount and about 0.5 to 70 weight percent of an aliphatic hydroxyl-containing 1,3-diene hydrocarbon unsaturated polymer having the majority of its unsaturation in the main hydrocarbon chain and at least about 1.8 predominantly primary, terminal allylic hydroxyl groups per polymer molecule, and a Staudinger molecular weight of about 200 to 25,000, said aliphatic 1,3-diene hydrocarbon having 4 to about 12 carbon atoms and said amount of aliphatic diene hydrocarbon unsaturated polymer being sufficient to reduce feed force when machining metals.

2. The composition of claim 1 wherein the diene hydrocarbon is 1,3-butadiene.

3. The composition of claim 1 wherein the hydroxyl containing diene hydrocarbon polymer is present in an amount of about 2 to 30 weight percent.

4. The composition of claim 1 wherein hydroxyl containing the diene hydrocarbon polymer has a hydroxyl value of about 0.7 to 1 and a Staudinger molecular weight of 1,200 to 7,000.

5. A method of cutting metals such as aluminum and copper which comprises conducting such cutting in the presence of the composition of claim 1.

6. A method of cutting metals such as aluminum and copper which comprises conducting such cutting in the presence of the composition of claim 2.

7. A method of cutting metals such as aluminum and copper which comprises conducting such cutting in the presence of the composition of claim 3.

8. A method of cutting metals such as aluminum and copper which comprises conducting such cutting in the presence of the composition of claim 4.

9. A method of cutting metals such as aluminum and copper which comprises conducting such cutting in the presence of a cutting oil composition comprising a mineral lubricating oil in lubricating amount and a member of the group consisting of (a) aliphatic 1,3-diene hydrocarbon unsaturated polymers, said aliphatic 1,3-diene hydrocarbon having 4 to about 12 carbon atoms, and said aliphatic diene hydrocarbon unsaturated polymer having a Staudinger molecular weight of about 200 to 25,000, and (b) such polymers containing at least 1.8 predominantly primary, terminal allylic hydroxyl groups per polymer molecule, the amount of said aliphatic diene hydrocarbon unsaturated polymer being sufficient to reduce feed force when machining metals.

10. A method of cutting metals such as aluminum and copper as set forth in claim 9 wherein the aliphatic diene hydrocarbon unsaturated polymer is in amount of about 0.5 to 70 weight percent of said mineral oil.

11. A method of cutting metals such as aluminum and copper as set forth in claim 9 wherein the aliphatic diene hydrocarbon unsaturated polymer is in amount of about 2 to 30 weight percent of said mineral oil.

12. A method of cutting metals such as aluminum and copper as set forth in claim 9 wherein the diene hydrocarbon is 1,3-butadiene.

13. A method of cutting metals such as aluminum and copper as set forth in claim 9 wherein the diene hydrocarbon is 1,3-butadiene, and the aliphatic diene hydrocarbon unsaturated polymer has the majority of its unsaturation in the main hydrocarbon chain and at least about 2.1 predominantly primary, terminal allylic hydroxyl groups per polymer molecule, and a Staudinger molecular weight of about 1200 to 7000.

14. The composition of claim 1 wherein said hydroxyl containing 1,3-diene hydrocarbon unsaturated polymer has a trans-1,4 unsaturation of about 40–70 percent.

15. A method of cutting metals such as aluminum and copper which comprises conducting such cutting in the presence of the composition of claim 14.

References Cited

UNITED STATES PATENTS

| | | | |
|---|---|---|---|
| 2,956,953 | 10/1960 | Whitney | 252—55 |
| 2,962,401 | 11/1960 | Guminski | 252—52 XR |
| 3,135,716 | 6/1964 | Uraneck et al. | 260—94.2 XR |
| 3,166,542 | 1/1965 | Orzechowski et al. | 252—59 XR |
| 3,124,531 | 3/1964 | Whetzel et al. | 252—52 |
| 3,298,951 | 1/1967 | Guminski | 252—59 XR |
| 2,142,980 | 1/1939 | Huijser et al. | 260—82 |
| 3,329,613 | 7/1967 | Fischer et al. | 252—59 |
| 3,078,237 | 2/1963 | Creech et al. | 252—59 X |
| 3,298,954 | 1/1967 | Brown | 252—59 X |
| 3,340,194 | 9/1967 | Rue et al. | 252—59 X |

OTHER REFERENCES 637,950  3/1964  Belgium.

DANIEL E. WYMAN, Primary Examiner
W. CANNON, Assistant Examiner

U.S. Cl. X.R.
252—52, 55